(12) United States Patent
Maffe'

(10) Patent No.: US 11,040,749 B2
(45) Date of Patent: Jun. 22, 2021

(54) LEGS APRON FOR A MOTOR VEHICLE

(71) Applicant: PIAGGIO & C. S.P.A., Pisa (IT)

(72) Inventor: Francesco Maffe', Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 57 days.

(21) Appl. No.: 16/482,612

(22) PCT Filed: Jan. 26, 2018

(86) PCT No.: PCT/IB2018/050495
§ 371 (c)(1),
(2) Date: Jul. 31, 2019

(87) PCT Pub. No.: WO2018/142254
PCT Pub. Date: Aug. 9, 2018

(65) Prior Publication Data
US 2020/0247495 A1    Aug. 6, 2020

(30) Foreign Application Priority Data

Feb. 1, 2017 (IT) .................. 102017000010768

(51) Int. Cl.
*B62J 17/06*    (2006.01)
(52) U.S. Cl.
CPC .................................. *B62J 17/065* (2013.01)
(58) Field of Classification Search
CPC ........ B62J 17/065; B62J 17/08; B62J 17/083; A41D 13/015; B60R 19/42
(Continued)

(56) References Cited

U.S. PATENT DOCUMENTS 3,901,549 A * 8/1975 Ramirez ................ B62J 17/065
296/78.1
4,650,204 A    3/1987 Bothwell
(Continued)

FOREIGN PATENT DOCUMENTS

| EP | 2982584 | * | 7/2015 | .............. B62J 17/06 |
| FR | 2 949 428 A1 | | 3/2011 | |
| FR | 3025776 | * | 6/2016 | .............. B62J 17/06 |

OTHER PUBLICATIONS

International Search Report and Written Opinion of the International Searching Authority for International Patent Application No. PCT/IB2018/050495 dated May 3, 2018, 8 pages.

*Primary Examiner* — Jason S Morrow
*Assistant Examiner* — Kevin P Weldon
(74) *Attorney, Agent, or Firm* — Merchant & Gould P.C.

(57) ABSTRACT

A legs apron for a motor vehicle includes a middle portion having a longitudinal axis; a first side portion and a second side portion, which extend laterally on opposite sides. The side portions define a first and a second folding portion, which extend according in a prevalent direction substantially parallel to the longitudinal axis. The legs apron has an operating configuration in which the side portions are folded along the folding portions to extend over a respective side transversely with respect to the middle portion. The apron has protection against impacts to protect the lower limbs of the driver. First and second protective bar couple to the first and second side portions. The protective bars each extend parallel or substantially parallel to the longitudinal axis. The protective bars are proximal to the first and second folding portions, to protect at least the femoral portions of the driver's legs.

21 Claims, 7 Drawing Sheets

(58) Field of Classification Search
USPC .................................................. 296/81, 82
See application file for complete search history.

(56) References Cited

U.S. PATENT DOCUMENTS

| | | | | |
|---|---|---|---|---|
| 5,375,262 | A * | 12/1994 | Carter ................ | A41D 13/0543 |
| | | | | 2/22 |
| 6,773,028 | B2 * | 8/2004 | Itabashi ............ | B60R 21/23138 |
| | | | | 280/730.1 |
| 8,333,398 | B2 * | 12/2012 | Oved ....................... | B62J 27/00 |
| | | | | 280/304.3 |
| 2004/0051336 | A1 * | 3/2004 | Chiao .................... | B62J 17/065 |
| | | | | 296/78.1 |
| 2011/0298237 | A1 * | 12/2011 | Klein ..................... | B60R 21/04 |
| | | | | 296/1.04 |
| 2013/0025037 | A1 * | 1/2013 | Turner ............... | A41D 13/0593 |
| | | | | 2/455 |
| 2021/0053641 | A1 * | 2/2021 | Maffe .................... | B62J 17/065 |

* cited by examiner

LEGS APRON FOR A MOTOR VEHICLE

This application is a National Stage Application of PCT/IB2018/050495, filed 26 Jan. 2018, which claims benefit of Serial No. 102017000010768, filed 1 Feb. 2017 in Italy and which applications are incorporated herein by reference. To the extent appropriate, a claim of priority is made to each of the above-disclosed applications.

BACKGROUND OF THE INVENTION

The present invention in general relates to the field of motor vehicles and the related accessories, and in particular it relates to a legs apron for a motor vehicle.

In the field of motor vehicles, such as e.g. motor scooters, it is known to use legs aprons serving the function of protecting the legs of the driver against bad weather, especially during the winter. An example of a legs apron according to the known art is introduced in document FR2949428 to Bagster. Such a document in particular describes a legs apron commonly shaped with a middle portion and two side portions or sides which extend from respective parts with respect to the middle portion. The apron is provided with a stiffening system of the sides to limit the fluttering about thereof during operation. In particular, it is an insert—for each side—shaped like a boomerang, which end portions can be inserted into respective pockets in order to stretch the side fabric of the apron and therefore limit the movements thereof when hit by a flow of wind during operation. It therefore serves the function similar to a deflector.

Like other common legs aprons, the legs apron according to above-described known art has the restriction of only providing a protection against bad weather, while it does not offer any protection to the limbs of the driver in case of impact or fall. To this end, it is also worth noting that although the known legs aprons are designed to try to ensure the maximum freedom of movement of the driver, the use of a legs apron inevitably results in difficulties in separating from the apron itself, for example in the case of a fall. Therefore, the need is particularly felt to reduce the risk of physical damage to the driver as much as possible in the case of an impact or a fall when a motor vehicle is used with a legs apron.

SUMMARY OF THE INVENTION

It is an object of the present description to make available a legs apron which allows the above drawbacks with reference to the known art to be resolved or at least partly obviated.

BRIEF DESCRIPTION OF THE DRAWINGS

The invention will be better understood from the following detailed description of embodiments thereof, given by way of example and therefore non-limiting in relation to the accompanying drawings, in which.

DETAILED DESCRIPTION OF THE PREFERRED EMBODIMENTS

Equal or similar elements are indicated with the same numerals in the accompanying figures.

It is also worth noting that the terms "top", "bottom", "upper", "lower", "vertical", "horizontal" used to describe a part of the legs apron refer to the legs apron used by the driver of the motor vehicle in a normal condition of use.

Figure 1:
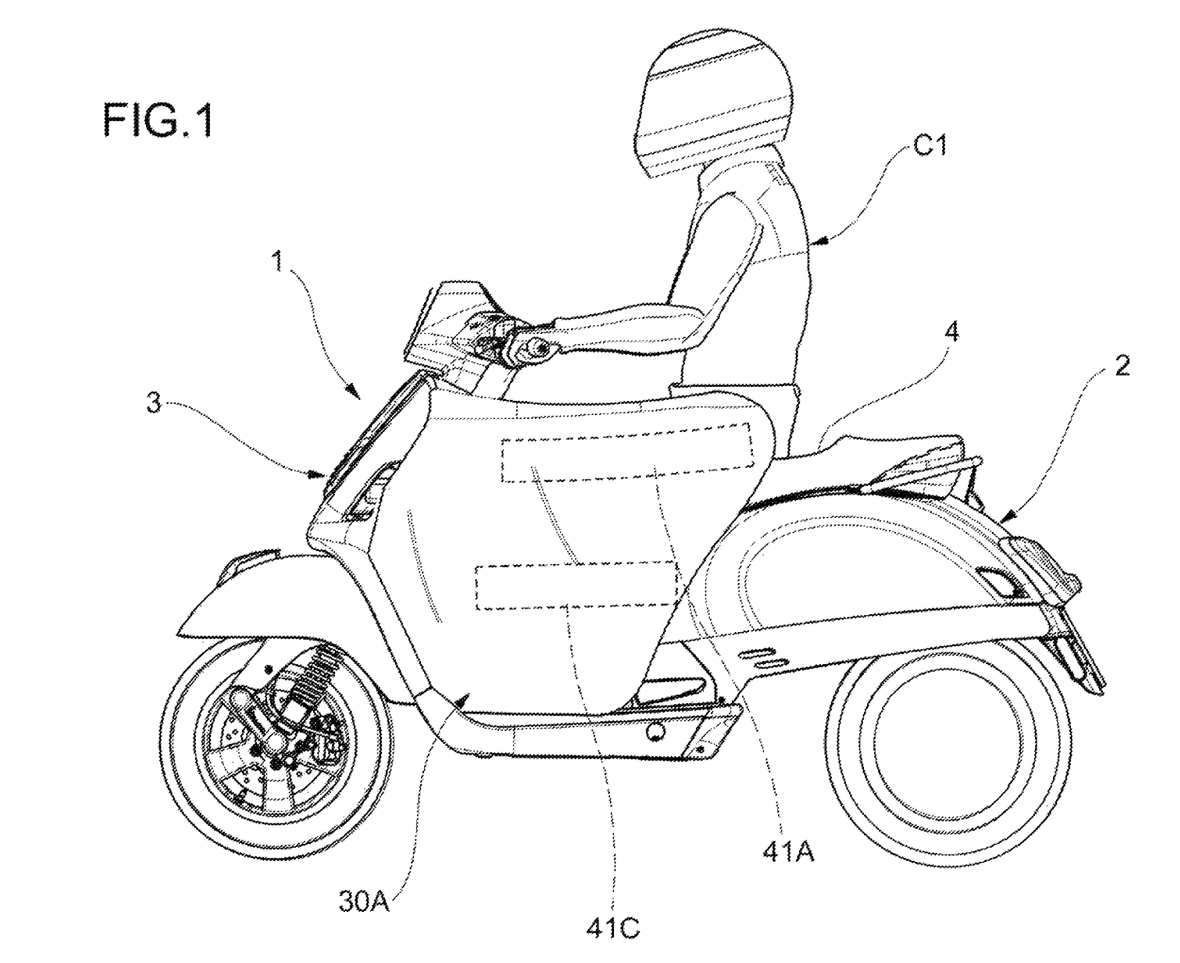
FIG. 1 is a flat side view showing a motor vehicle with the related driver while the latter uses a legs apron according to a currently preferred embodiment, certain elements not visible in FIG. 1 being depicted by means of dotted lines.
Figure 2:
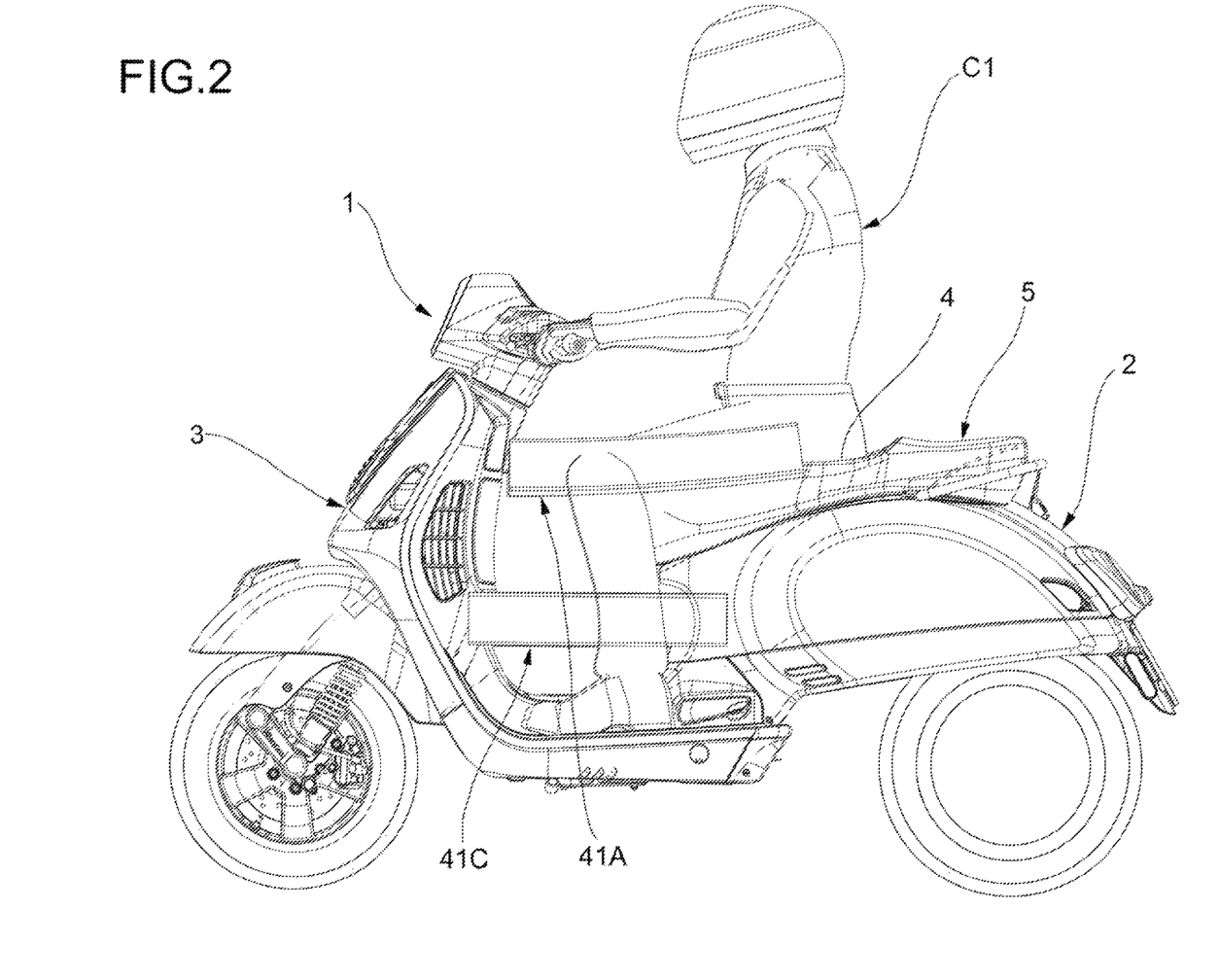
FIG. 2 is a flat side view similar to FIG. 1, in which a part of the legs apron in FIG. 1 was removed to show elements of the legs apron which are hidden in FIG. 1.
Figure 3:
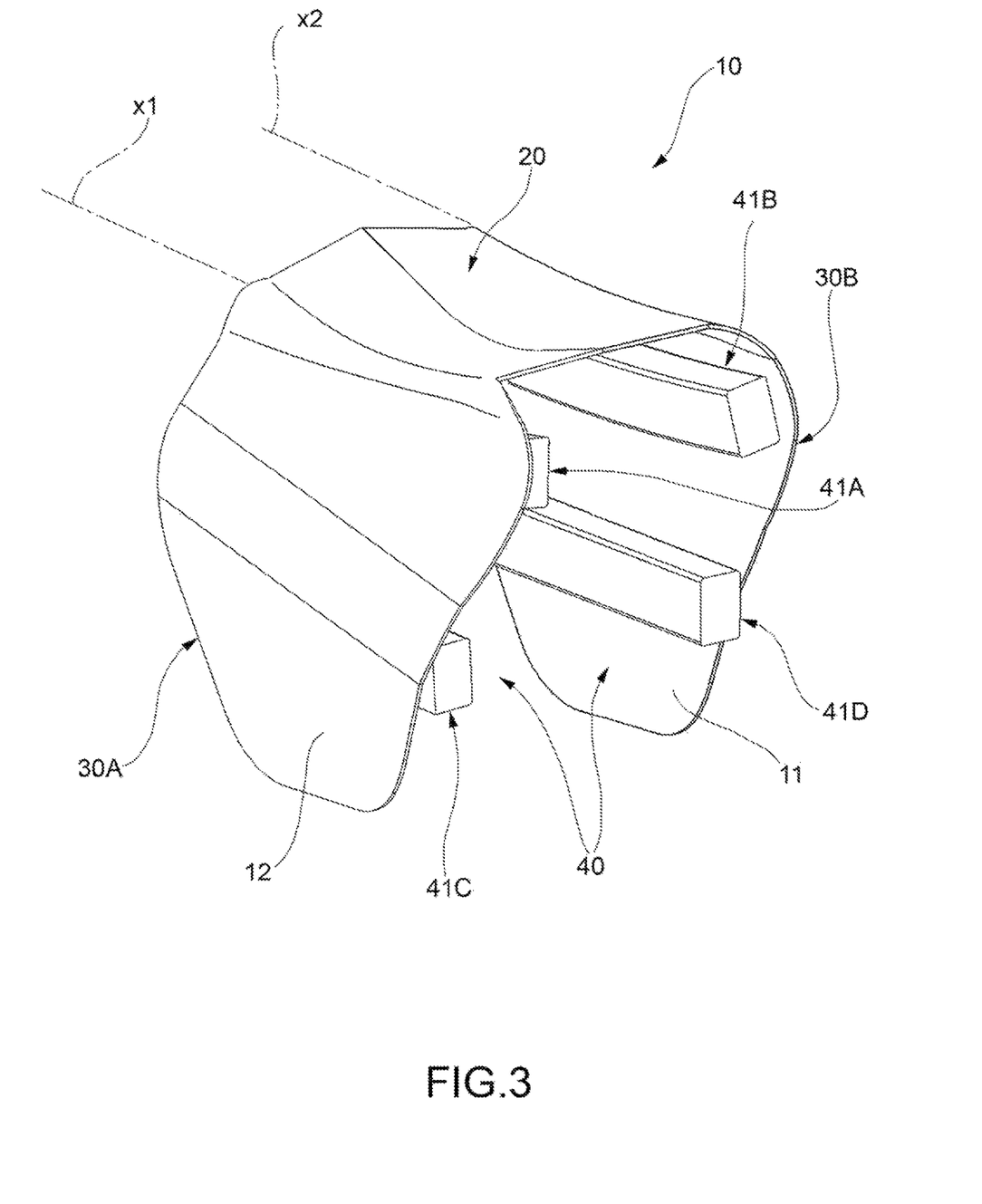
FIG. 3 is a rear axonometric view of the legs apron in FIG. 1 depicted in the configuration in FIG. 1.

With reference initially to FIGS. 1 to 4, a legs apron according to a currently preferred embodiment is generally indicated with numeral 10. In FIG. 1, the legs apron 10 is fastened to a motor vehicle 1, such as for example a motor scooter 1. It is worth noting in any case that for the purposes of the present description, the term motor vehicle is generally meant to comprise all two- or three-wheel motor vehicles suitable for being used with a legs apron, such as for example and not exhaustively, mopeds, motor scooters etc. In a manner in itself known, the legs apron 10 serves the main function of protecting the legs of a driver C1 of the motor vehicle 1 from bad weather and from the cold. For this reason, the legs apron 10 preferably is made by means of a waterproof fabric.

Figure 4:
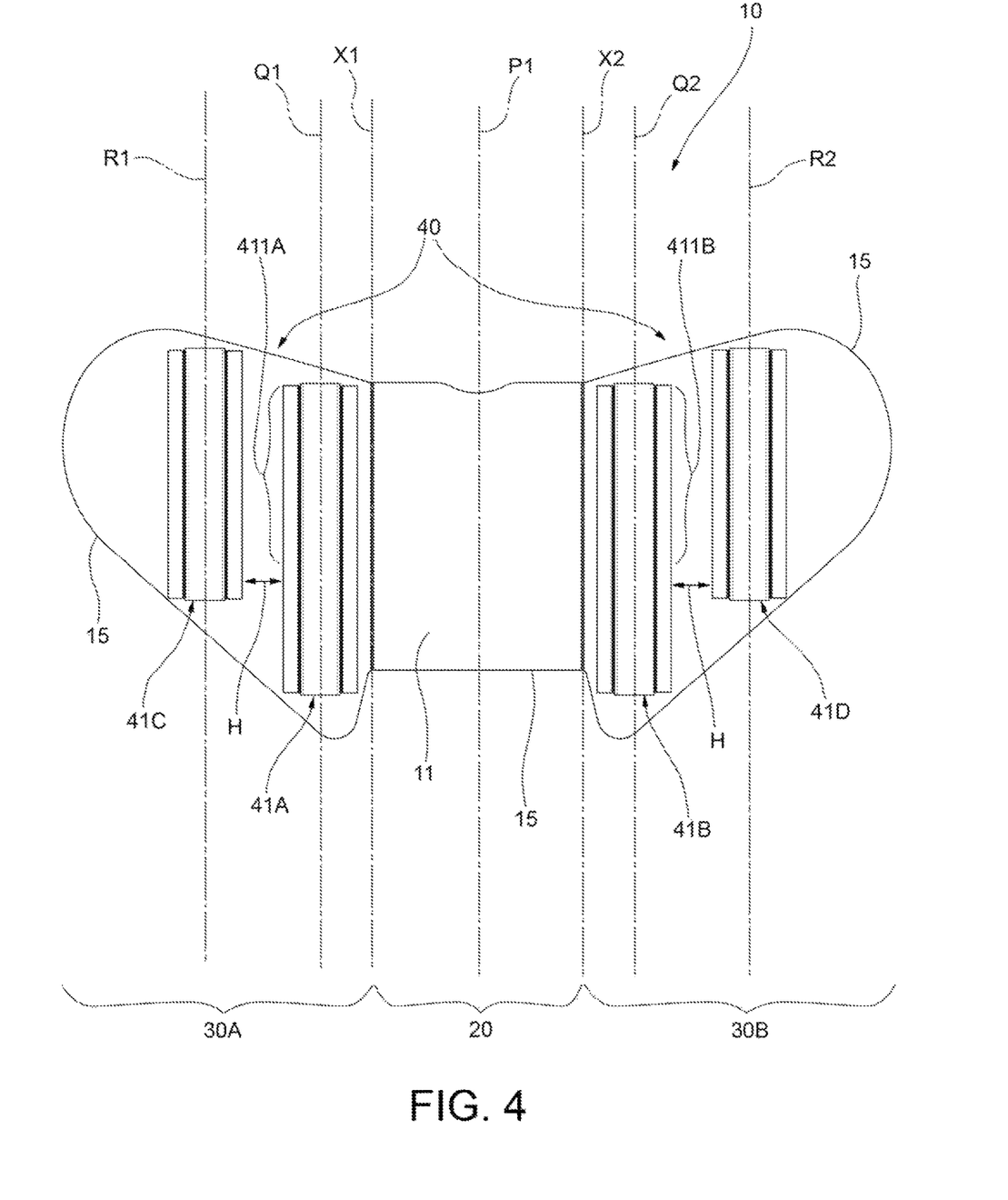
FIG. 4 is a flat bottom view of the legs apron in FIG. 1 in which the apron is depicted in an unfolded configuration.

With reference to FIG. 4, the legs apron 10 comprises a longitudinal axis P1, a middle portion 20 and a first and a second side portion 30A, 30B. Preferably, the longitudinal axis P1 is a middle longitudinal axis of apron 10. According to a preferred embodiment, axis P1 is a middle axis of symmetry of a perimeter edge 15 of apron 10. When apron 10 is used with the motor vehicle 1 in a normal condition of use, as shown for example in FIG. 1, the longitudinal axis P1 extends in a direction which joins a rear part 2 of the motor vehicle 1 with a front part 3 of the motor vehicle 1. The first and the second side portion 30A, 30B extend laterally on opposite sides with respect to such a middle portion 20 and symmetrically with respect to the longitudinal axis P1. In a manner in itself known, the middle portion 20 serves the function of covering the legs of driver C1 at the top while the side portions 30A, 30B serve the function of covering the legs of driver C1 laterally. The first side portion 30A and the second side portion 30B define a first and a second folding portion X1, X2, respectively, which extend according to a prevalent direction which is parallel or substantially parallel to the longitudinal axis P1.

The legs apron 10 is suitable for taking on an operating configuration (FIGS. 1 to 3) in which the first and the second side portion (30A, 30B) are folded along the first and the second folding portion (X1, X2), respectively, so as to both extend over a respective side transversely with respect to the middle portion (20). In the operating configuration shown in FIGS. 1 to 3, the portions 30A, 30B preferably extend orthogonally or substantially orthogonally to the middle portion 20. Preferably, the middle portion 20 is laterally delimited by the folding portions X1, X2. As can be noted in FIG. 3, the portions 30A, 30B face each other in the operating configuration.

Again with reference to FIG. 4, apron 10 comprises means 40 for protecting against impacts for protecting the lower limbs of driver C1. The means 40 for protecting against impacts include at least a first and a second protective bar 41A, 41B, or leg-guard bars 41A, 41B, coupled to the first and to the second side portion 30A, 30B, respectively. Preferably, the first and the second protective bar are identical to each other. The bars 41A, 41B preferably are semi-rigid bars made of a material capable of absorbing an impact, preferably a plastic material and more preferably a polymeric foam.

The first and second protective bar 41A, 41B each extend according to a respective prevalent direction of extension Q1, Q2 which is parallel or substantially parallel to the longitudinal axis P1. Moreover, the first and second protective bar 41A, 41B are arranged in position proximal to the first and to the second folding portion X1, X2, respectively, so as to protect at least the femoral portions of the legs of driver C1 of the motor vehicle 1 in the event of an impact or fall.

According to one embodiment, the first and second protective bar 41A, 41B comprise at least a first and at least a second longitudinal portion 411A, 411B, respectively, which are arranged proximal to the first and to the second folding portion X1, X2, respectively. In particular, the first and the second bar are arranged on the side wall at a distance with respect to the folding portion comprised between 2 cm and 40 cm, preferably between 5 cm and 10 cm. In other words, as can be noted in FIG. 2, at least the longitudinal portions 411A, 411B are substantially positioned at the height of a sitting plane 4 of saddle 5 of the motor vehicle 1 on which it is suitable for driver C1 to sit on. Practically, the protective bars 41A, 41B, and in particular at least the respective longitudinal portions 411A, 411B, are arranged so as to at least protect the femoral portions (portions comprised between the pelvis/knee joints) of the legs of driver C1 of the motor vehicle 1 in the case of impact, particularly in the case of an impact at low speed. It is worth noting that the expression "substantially parallel" herein used means that the directions Q1, Q2 may also not be perfectly parallel to the longitudinal axis P1. In other words, in a plan extension of the legs apron 10, as shown for example in FIG. 4, the directions Q11 and Q2 could form a small angle with axis P1, in particular an angle less than 20°, in any case such as to ensure an effective protection at least of the femoral portion of the legs of driver C1.

According to a preferred embodiment, the first and the second protective bar 41A, 41B extend for the whole length over the first and over the second side portion 30A, 30B, respectively.

In particular, the first and second protective bar 41A, 41B are connected to the apron so as to make the bars adhere to the apron substantially along their whole length. In other words, the protective bars are connected, in multiple places or continuously, to the apron without creating gaps between the apron and bar.

In detail, each bar is made from a material deformable in compression when subjected to a force of impact substantially orthogonal to the side walls of the apron; for example a force due to a lateral collision. In other words, the bars 41A, 41B are made from a material deformable in compression according to a direction substantially orthogonal to said prevalent direction of extension Q1, Q2. Compression deformation is ensured by the thickness of the bar, i.e. by the extension of the bar in the direction orthogonal to the longitudinal direction P1. Said longitudinal direction P1 it is also orthogonal to the surface of the side portions 30A, 30B of the apron. In other words this dimension defines the thickness of the bar, which thickness is cantilevered with respect to the apron 10. This thickness ensures an attenuation of the force of impact up to absorb shocks with bodies with a speed of 12 km/h.

According to an embodiment, constructively, each protective bar is made from low density polyethylene (LDPE) and more preferably from a LDPE foam. Preferably, such low density polyethylene (LDPE) has a density of about 30 g/dm$^3$. Moreover, always according to a preferred embodiment, each protective bar has a section that has a first side having a length between 70 and 120 mm, and a second side having a length between 70 and 120 mm. In particular, the first side is connected to the apron, and the second side, representing the thickness of the bar, is cantilevered with respect to the apron. Alternatively, the protective bar can have circular or trapezoidal section and be connected to the apron through buttonholes, belts or pockets. According to a convenient embodiment, the means 40 for protecting against impacts comprise a third and a fourth protective bar 41C, 41D coupled to the first and to the second side portion 30A, 30B, respectively. Preferably, the bars 41C and 41D are identical to each other. According to a preferred embodiment, the bars 41C, 41D are made of the same material as the bars 41A, 41B. The bars 41C, 41D conveniently allow an effective protection of the tibial portions (portions comprised between the knee/ankle joints) and possibly also of the lower end (metatarsus) of the legs of driver C1 in the case of impact. According to a preferred embodiment, the third and the fourth protective bar 41C, 41D extend for the whole length over the first and over the second side portion 30A, 30B, respectively. According to a convenient embodiment, the third and fourth protective bar 41C, 41D each extend according to a respective prevalent direction of extension R1, R2 which is parallel or substantially parallel to said longitudinal axis P1. According to an alternative embodiment (not shown), the third protective bar 41C extends according to a respective prevalent direction of extension which is transverse to the first folding portion X1 and the fourth protective bar 41D extends according to a respective prevalent direction of extension which is transverse to the second folding portion X2. In this case, the bars 41C and 41D may be arranged for example and not exhaustively, so as to be orthogonal or substantially orthogonal to the longitudinal portion 411A of bar 41A and to the longitudinal portion 411B of bar 41B, respectively.

According to a convenient embodiment, the first, the second, the third and the fourth protective bar 41A-41D are rectilinear or prevalently rectilinear bars. The fact of providing rectilinear protective bars conveniently reduces the possibility of tensions being generated in the protective bars themselves. Such tensions also could result in undesired uncouplings of portions in Velcro which, as described in detail later in the present description, may be used for coupling the protective bars 41A-41D to apron 10.

In particular, the first and the third protective bar 41A, 41C are parallel to each other and are spaced apart transversely by a predetermined distance H. Similarly, the second and the fourth protective bar 41B, 41D are parallel to each other and are spaced apart transversely to said predetermined distance H. According to a preferred embodiment, such a distance H generally is comprised between 5 cm and 50 cm, and more preferably it is comprised between 10 cm and 20 cm.

Figure 6:
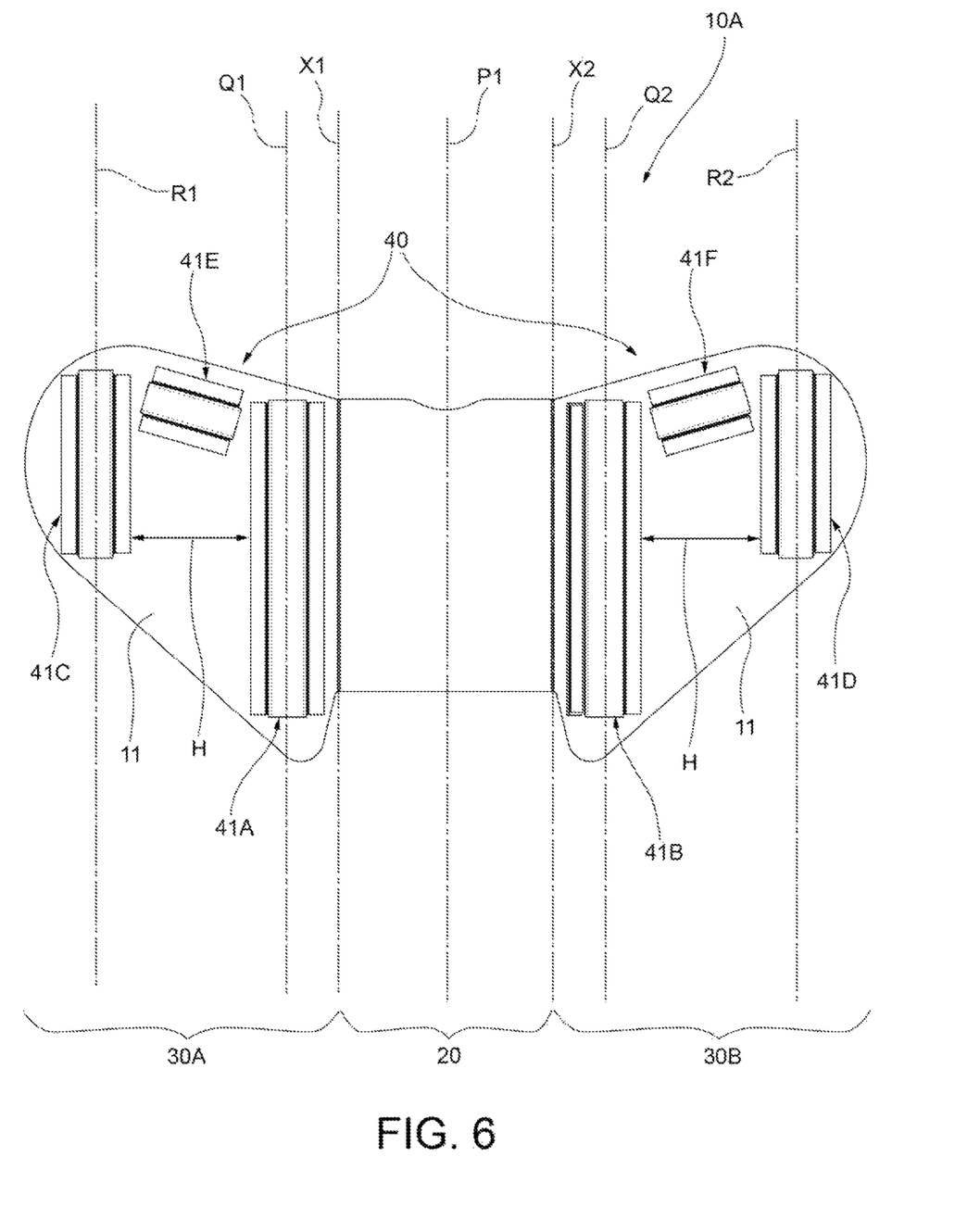
FIG. 6 is a flat bottom view of a legs apron according to a second preferred embodiment in which the apron is depicted in an unfolded configuration; and finally.

With reference to FIG. 6, there is illustrated a legs apron 10A according to a second preferred embodiment. Apron 10A differs from the legs apron 10 illustrated in FIGS. 1 to 4 essentially only in that in addition to the protective bars 41A-41D, the means 40 for protecting against impacts comprise a fifth protective bar 41E and a sixth protective bar 41F which are coupled to the first and to the second side portion 30A, 30B, respectively. In particular, the fifth protective bar 41E is interposed between the first and the third protective bar 41A, 41C. Moreover, the fifth protective bar 41E is arranged transversely to the first and to the third protective bar 41A, 41C. Similarly, the sixth protective bar 41 F is interposed between the second and the fourth protective bar 41B, 41D. Moreover, the sixth protective bar 41F is arranged transversely to the second and to the fourth protective bar 41B, 41D.

Figure 7:
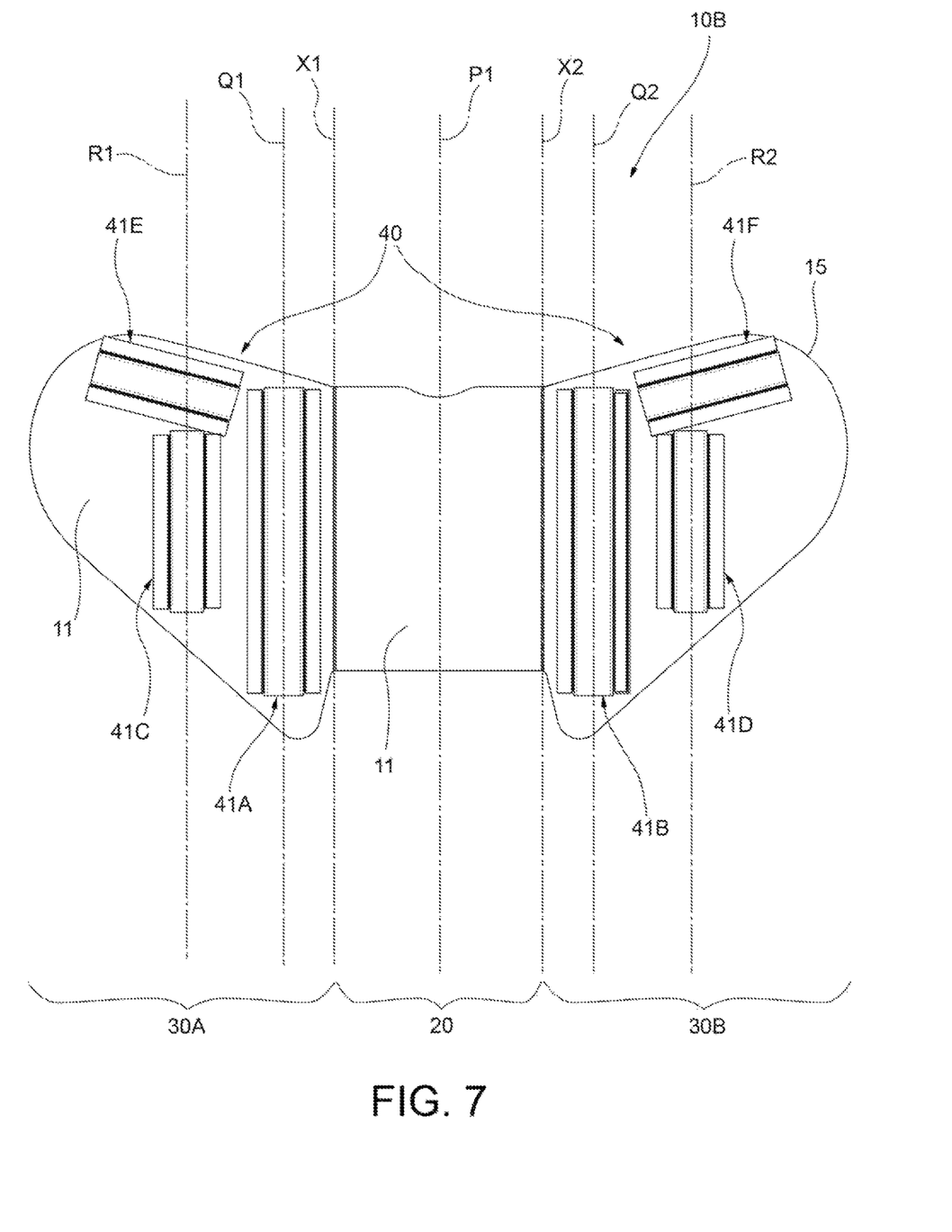
FIG. 7 is a flat bottom view of a legs apron according to a third preferred embodiment in which the apron is depicted in an unfolded configuration.

With reference to FIG. 7, there is illustrated a legs apron 10B according to a third preferred embodiment. Apron 10B differs from the legs apron 10B illustrated in FIG. 6 essentially only for the arrangement of the protective bars 41A-41F. In particular, as can be noted in FIG. 7, the fifth protective bar 41E is arranged with the third protective bar 41C substantially like an "L" or a "T", in which the sixth protective bar 41F is arranged with the fourth protective bar 41D substantially like an "L" or a "T".

Figure 5:
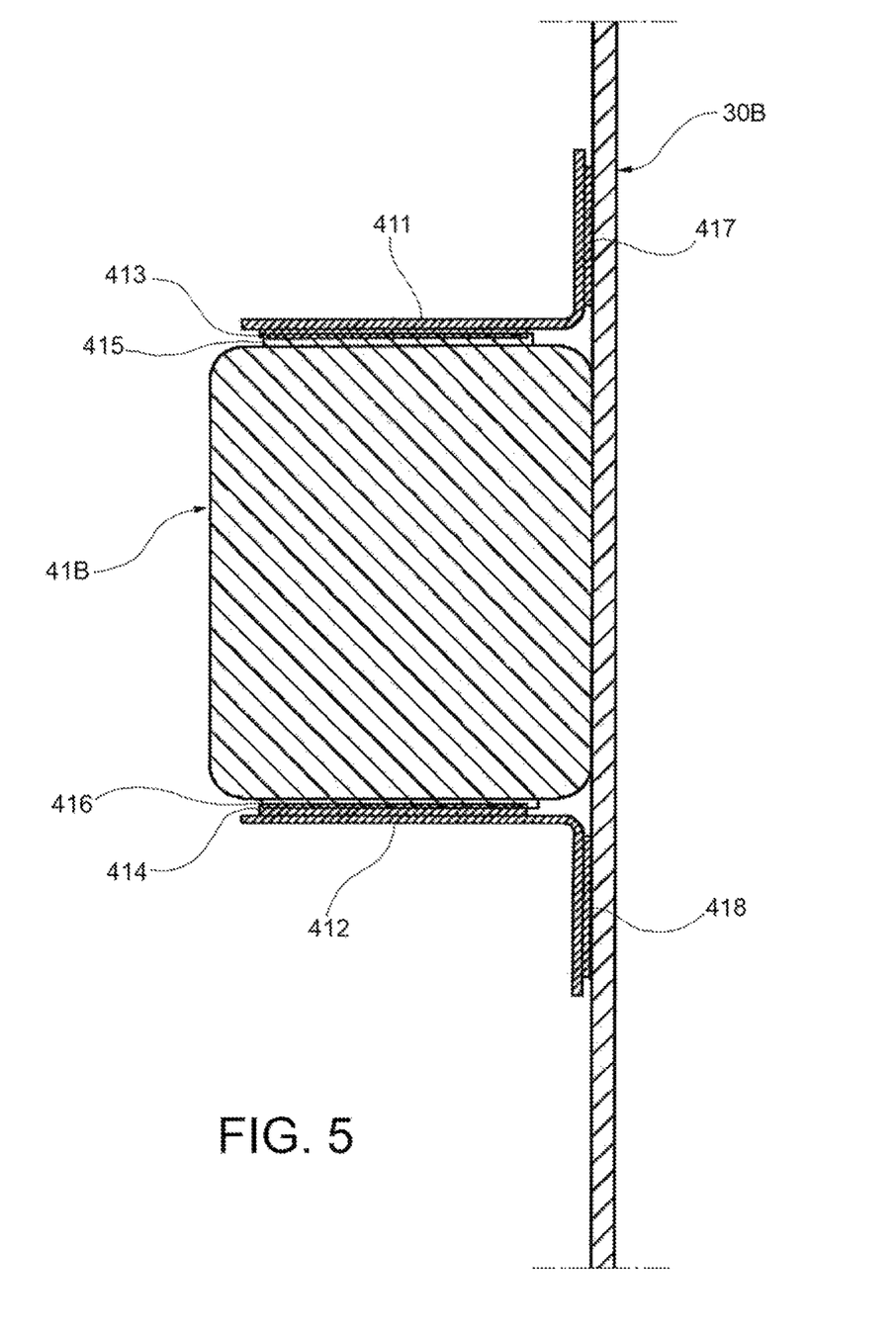
FIG. 5 is a cross-section view of an enlarged detail of the legs apron in FIG. 1.

According to a convenient embodiment, the legs apron 10 comprises coupling elements 411-418 for each protective bar 41A, 41B, which elements are suitable for removably coupling the first and the second protective bar 41A, 41B to the first and to the second side portion 30A, 30B, respectively. With reference to FIG. 5, according to a convenient embodiment, such coupling elements 411-418 comprise a pair of longitudinal fins 411, 412 for each protective bar 41A, 41B, where such pairs of longitudinal fins 411, 412 are connected to the first and to the second side portion 30A, 30B, respectively. Preferably, the fins 411, 412 are flexible fins, preferably made with the same fabric with which apron 10 is made. Moreover, such coupling elements comprise, for each protective bar 41A, 41B, first attachment elements 413-416 for attaching the first and the second protective bar 41A, 41B to the respective pair of fins 411, 412. It is worth noting that FIG. 5 depicts a cross section of a part of the legs apron 10 in which there are shown only the coupling elements 411-418 suitable for removably coupling the second protective bar 41B to the second side portion 30B. However, it is worth noting that the coupling elements (not shown) which are identical or similar to the coupling elements 411-418 are used for coupling the protective bar 41A to the side portion 30A of the legs apron 10. It is also worth noting that the coupling elements (not shown) which are identical or similar to the coupling elements 411-418 may be used for coupling the bars 41C, 41D, 41E, 41F, when provided, to the portions 30A and 30B. For such a reason and for brevity of description, the coupling elements used for coupling the protective bar 41A and, when present, the protective bars 41C, 41D, 41E, 41F, to the side portions 30A, 30B of the legs aprons 10, 10A, 10B are not herein further described. It is however understood that what is described later in relation to the coupling elements 411-418 is applied, mutatis mutandis, also to the coupling elements provided for coupling the protective bars 41A, 41C, 41D, 41E and 41F to the legs aprons 10, 10A, 10B.

Again with reference to FIG. 5, it can be noted that the fins 411, 412 overlap each other to removably surround the protective bar 41B on opposite sides. The first attachment elements 413-416 are integral with the fins 411, 412 and/or the protective bar 41B so as to be interposed between the fins 411, 412 and the protective bar 41B so as to retain the protective bar 41B interposed between the fins 411, 412. According to a preferred embodiment, the attachment elements 413-416 comprise a first pair of Velcro® strips 413, 414 and a second pair of Velcro® strips 415, 416. In particular, the strips 413 and 414 are fastened to fin 411 and to fin 412, respectively, while the strips 415, 416 are fastened on two opposite faces of bar 41B so as to couple with strip 413 and with strip 414, respectively, as shown in FIG. 5. According to a convenient embodiment, the strips 413, 414 are female Velcro® strips while the strips 415, 416 are male Velcro strips. Thereby, it is avoided for the Velcro® to damage the clothing of driver C1 when the protective bars 41A-41F are not used or when only some of them are used. Preferably, the strips 413, 414 are sewn to the fins 411, 412 while the strips 415, 416 are glued to the protective bar 41B.

Again with reference to FIG. 5, according to one embodiment, the coupling elements 411-418 comprise second attachment elements 417, 418 for connecting the pair of fins 411, 412 to the side portion 30B. The second attachment elements 417, 418 are integral with the fins 411, 412 and/or the side portion 30B so as to be interposed between the fins 411, 412 and the protective bar 30B.

It is worth noting that according to a preferred embodiment, the first attachment elements 413-416 and/or the second attachment elements 417, 418 preferably are attachment elements adapted to allow a removable coupling, and preferably they are selected from among: Velcro®, button elements, stitching and the like.

According to a preferred embodiment, the protective bars 41A, 41B and the bars 41C, 41D, 41E, 41F, when provided, each have a circular or polygonal cross section. According to a preferred embodiment, such a polygonal cross section is a rectangular or square cross section. To this latter end, it is worth noting that a rectangular or square cross section allows the maximum contact surface to be obtained between the protective bars 41A-41F and the legs of driver C1. Thereby, the maximum absorption of residual force may therefore be obtained following an impact from the outside in relation to the contact point (impact which may be of various origin: orthogonal, angled or friction due to rubbing). Moreover, the fact of providing protective bars with a rectangular or square cross section allows the gluing of the Velcro strips attached on two opposite faces of each protective bar, to be made more secure.

It is worth noting that the lengths of the bars 41A-41F may in general vary according to the size of the aprons 10, 10A, 10B because the ergonomic heights (handlebar/saddle/footboard) vary as the particular model of the motor vehicle to which apron 10, 10A, 10B has to be applied, varies.

It is worth noting that if the legs apron 10, 10A, 10B comprises a plurality of protective bars which can be removably coupled to each of the side portions 30A, 30B, for example the two bars 41A, 41C or the three bars 41A, 41C, 41E on portion 30A and the two bars 41B, 41D or the three bars 41B, 41D, 41 F on portion 30B, the application of zero, one or more bars to each portion 30A, 30B of the legs apron is at the discretion of the end user, who according to his/her needs, may opt for the configuration of maximum protection, or not.

It is worth noting that in the embodiments shown in the accompanying drawings, the bars 41A-41F are coupled to an inner face 11 of the legs apron 10, 10A, 10B. However according to a convenient embodiment, there may be provided a plurality of supplementary protective bars (not shown) coupled to an outer face 12 of the legs apron 10, 10A, 10B which is opposite to the inner face 11. Such supplementary bars advantageously allow the thickness, and therefore the level of protection, of the legs apron 10 to be increased. It is worth noting that in the present description, the terms "inner" and "outer" refer to the middle of the space comprised between the side portions 30A, 30B of the legs apron 10, 10A, 10B when apron 10,10A, 10B takes on the operating configuration in FIG. 3.

For example, according to a preferred embodiment, two further supplementary bars equal or similar to the bars 41A and 41B may be coupled, simultaneously to the bars 41A, 41B, to the outer face 12 of apron 10, and be positioned in an identical or substantially identical manner to the bars 41A, 41B. According to a further embodiment, there may be provided four further supplementary bars, two of which equal or similar to the bars 41A, 41B, and two equal or similar to the bars 41C, 41D, which, simultaneously to the bars 41A-41D coupled to the inner face 11 of apron 10, are applied to the outer face 12 of apron 10, each at a respective bar 41A-41D. According to one embodiment, such supplementary bars may be of high visibility colors (fluorescent, reflecting or other visual identification systems) to increase the side visibility of apron 10 and accordingly the passive safety of the driver. Preferably, the aforesaid supplementary bars are beveled at the respective ends in order not to cause aerodynamic disturbances.

According to that described above, it may be understood how a legs apron according to the present description allows the above-mentioned objects to be achieved with reference to the known art.

Conveniently, a legs apron according to the present description allows a solid, and at the same time comfortable, gap to be kept between the legs of the driver of the motor vehicle and dangerous external agents, which allows the legs of the driver to be effectively protected, particularly in the case of impacts at low speed. A legs apron according to the present description is not only a protective shield against the weather agents, but also a true flexible "casing" which offers the driver also increased psychological wellbeing. To this end, it is worth noting that the increase in comfort is one of the most important general parameters for raising the active safety level on two wheels. It is worth noting that the description of the legs apron according to the present invention is equivalent to the description of a covering kit, again according to the present invention, comprising a legs apron 10; 10A; 10B adapted to be applied to a motor vehicle 1, in which the motor vehicle 1 comprises a front portion 3, a rear portion 2 and a sitting plane 4 for a driver C1. The legs apron 10; 10A; 10B comprising:

- a middle portion 20 having a longitudinal axis P1, which extends between said front portion 3 and said rear portion 2 of the motor vehicle 1;
- a first side portion 30A and a second side portion 30B, which extend laterally on opposite sides with respect to said middle portion 20;
- in which the first side portion 30A and the second side portion 30B define a first folding portion and a second folding portion X1, X2, respectively, which extend according to a prevalent direction substantially parallel to said longitudinal axis P1.

The legs apron 10; 10A; 10B is suitable for taking on an operating configuration in which the first and the second side portion 30A, 30B are folded along the first and the second folding portion X1, X2, respectively, so as to both extend over a respective side transversely with respect to the middle portion 20;

apron 10; 10A; 10B comprises means 40 adapted to protect against impacts for protecting the lower limbs of driver C1. The protective means 40 comprise at least a first and a second protective bar 41A, 41B coupled to the first and to the second side portion 30A, 30B, respectively. The first and second protective bar 41A, 41B each extend according to a respective prevalent direction of extension Q1, Q2 which is parallel or substantially parallel to said longitudinal axis P1, and they are positioned substantially at the height of said sitting plane 4 so as to protect at least the femoral portions of the legs of driver C1 of the motor vehicle 1 in the event of an impact.

It is also worth noting that by describing a legs apron according to the present invention, a motor vehicle comprising a legs apron 10; 10A, 10 was also practically described.

The principle of the invention being understood, the embodiments and manufacturing details may largely vary with respect to that described and illustrated by mere way of non-limiting example, without departing from the scope of the invention as defined in the appended claims.

The invention claimed is:

1. A legs apron for a motor vehicle, comprising:
   a middle portion having a longitudinal axis;
   a first side portion and a second side portion, the first side portion and the second side portion extending laterally on opposite sides with respect to the middle portion;
   wherein the first side portion and the second side portion fold along a first folding portion and a second folding portion, respectively, which extend according to a prevalent direction substantially parallel to said longitudinal axis;
   wherein the legs apron has an operating configuration wherein the first side portion and the second side portion are folded along the first folding portion and the second folding portion, respectively, so both the first side portion and the second side portion extend over one of said opposite sides transversely with respect to the middle portion;
   means for protecting against impacts to protect lower limbs of a driver against impacts, the means for protecting against impacts comprising at least a first protective bar and a second protective bar coupled to the first side portion and to the second side portion, respectively;
   wherein said first protective bar and said second protective bar each extend according to a respective prevalent direction of extension parallel or substantially parallel to said longitudinal axis; and
   wherein said first protective bar and said second protective bar are made from a material deformable in compression according to a direction substantially orthogonal to said prevalent direction of extension, and wherein said first protective bar and said second protective bar are arranged in position proximal to the first folding portion and to the second folding portion to protect at least femoral portions of the legs of the driver of the motor vehicle an impact or fall.

2. Legs apron according to claim 1, wherein each of said first protective bar and said second protective bar is connected to the apron to make the bar adhere substantially along a whole length to the respective side portion.

3. Legs apron according to claim 1, wherein said first protective bar and said second protective bar are made from polyethylene.

4. Legs apron according to claim 1, wherein said first protective bar and said second protective bar have a section that has a first side having a length between 70 and 120 mm, and a second side having a length between 70 and 120 mm, and wherein the first side is connected to the legs apron, and the second side, is cantilevered with respect to the legs apron.

5. Legs apron according to claim 1, wherein said first protective bar and said second protective bar comprise at least a first longitudinal portion and at least a second longitudinal portion, respectively, which extend according to a direction which is substantially parallel to said longitudinal axis.

6. Legs apron according to claim 1, wherein the first protective bar and the second protective bar extend for the whole length over the first side portion and over the second side portion, respectively.

7. Legs apron according to claim 1, comprising a third protective bar and a fourth protective bar, coupled to the first side portion and to the second side portion, respectively.

8. Legs apron according to claim 7, wherein the third protective bar and the fourth protective bar extend for the whole length over the first side portion and over the second side portion, respectively.

9. Legs apron according to claim 7, wherein the third protective bar and the fourth protective bar each extend according to a respective prevalent direction of extension which is parallel or substantially parallel to said longitudinal axis.

10. Legs apron according to claim 7, wherein the third protective bar extends according to a respective prevalent direction of extension which is transverse to the first folding portion and wherein the fourth protective bar extends according to a respective prevalent direction of extension which is transverse to the second folding portion.

11. Legs apron according to claim 9, wherein the first, the second, the third protective bar and the fourth protective bar are rectilinear or mainly rectilinear bars, wherein the first protective bar and the third protective bar are parallel to each other and are transversely spaced apart by a predetermined distance, wherein the second protective bar and the fourth protective bar are parallel to each other and are transversely spaced apart by said predetermined distance.

12. Legs apron according to claim 11, wherein said predetermined distance is comprised between 5 cm and 50 cm.

13. Legs apron according to claim 11, wherein said means for protecting against impacts comprise a fifth protective bar and a sixth protective bar coupled to the first side portion and to the second side portion, respectively, wherein the fifth protective bar is interposed between and arranged transversely to the first protective bar and to the third protective bar, wherein the sixth protective bar is interposed between and arranged transversely to the second protective bar and to the fourth protective bar.

14. Legs apron according to claim 11, wherein said means for protecting against impacts comprise a fifth protective bar and a sixth protective bar coupled to the first side portion and to the second side portion, respectively, wherein the fifth protective bar is arranged with the third protective bar substantially like an "L" or a "T", wherein the sixth protective bar is arranged with the fourth protective bar substantially like an "L" or a "T".

15. Legs apron according to claim 11, comprising coupling elements for removably coupling each of said protective bars at the respective side portion of said side portions.

16. Legs apron according to claim 15, wherein for each of said protective bars, said coupling elements comprise:

a pair of longitudinal fins connected to the respective side portion, the fins of said pair of fins being opposite to each other to removably surround said protective bar on opposite sides; and first attachment elements for attaching the protective bar to said pair of fins, said first attachment elements being integral with said fins and/or with said protective bar to be interposed between the fins of said pair of fins and the protective bar, to retain the protective bar interposed between the fins of said pair of fins.

17. Legs apron according to claim 16, wherein said coupling elements comprise second attachment elements for connecting said pair of fins to the respective side portion, said second attachment elements being integral with said fins and/or said side portion to be interposed between the fins of said pair of fins and the side portion.

18. Legs apron according to claim 16, wherein said first and/or second attachment elements are selected from among: hook and loop fasteners, button elements, and stitching.

19. Legs apron according to claim 1, wherein each of said protective bars has a cross section selected from among a circular or polygonal shape.

20. A covering kit comprising a legs apron adapted to be applied to a motor vehicle, wherein said motor vehicle comprises a front portion, a rear portion and a sitting plane for a driver,
wherein said legs apron comprises
a middle portion having a longitudinal axis, which extends between said front portion and said rear portion of the motor vehicle;
a first side portion and a second side portion extending laterally on opposite sides with respect to said middle portion;
wherein the first side portion and the second side portion fold along a first folding portion and a second folding portion, respectively, which extend according to a main direction substantially parallel to said longitudinal axis;
wherein the legs apron has an operating configuration wherein the first side portion and the second side portion are folded along the first folding portion and the second folding portion, respectively, so both the first side portion and the second side portion extend over one of said opposite sides transversely with respect to the middle portion;
said apron comprising means for protecting against impacts which are adapted to protect lower limbs of the driver against impacts, the means for protecting against impacts comprising at least a first protective bar and a second protective bar coupled to the first side portion and to the second side portion, respectively;
wherein said first protective bar and said second protective bar each extend according to a respective prevalent direction of extension which is parallel or substantially parallel to said longitudinal axis, and they the first protective bar and the second protective bar are positioned substantially at a height of said sitting plane to protect at least femoral portions of legs of the driver of the motor vehicle in the event of an impact.

21. A motor vehicle comprising a legs apron as defined in claim 1.

* * * * *